United States Patent
Carapelli et al.

(10) Patent No.: US 9,496,920 B2
(45) Date of Patent: Nov. 15, 2016

(54) FUEL DISPENSING ENVIRONMENT UTILIZING RETROFIT BROADBAND COMMUNICATION SYSTEM

(71) Applicant: Gilbarco Inc., Greensboro, NC (US)

(72) Inventors: Giovanni Carapelli, Florence (IT); Joseph D. Long, Oak Ridge, NC (US); Wayne McNinch, Greensboro, NC (US); Howard Myers, Greensboro, NC (US)

(73) Assignee: Gilbarco Inc., Greensboro, NC (US)

( * ) Notice: Subject to any disclaimer, the term of this patent is extended or adjusted under 35 U.S.C. 154(b) by 630 days.

(21) Appl. No.: 13/679,764

(22) Filed: Nov. 16, 2012

(65) Prior Publication Data

US 2013/0121428 A1 May 16, 2013

Related U.S. Application Data

(60) Provisional application No. 61/560,624, filed on Nov. 16, 2011.

(51) Int. Cl.
   *H02J 3/34* (2006.01)
   *H04B 3/50* (2006.01)
   *H04B 3/54* (2006.01)

(52) U.S. Cl.
   CPC . *H04B 3/50* (2013.01); *H04B 3/54* (2013.01)

(58) Field of Classification Search
   CPC ........... H04B 3/54; H04B 3/50; G07F 13/02; G07F 13/025; G06Q 20/20
   USPC ............................................................ 307/3
   See application file for complete search history.

(56) References Cited

U.S. PATENT DOCUMENTS

| | | |
|---|---|---|
| 5,790,410 A | 8/1998 | Warn et al. |
| 5,889,676 A | 3/1999 | Kubo et al. |

(Continued)

FOREIGN PATENT DOCUMENTS

| | | |
|---|---|---|
| FR | 2876523 A1 | 4/2006 |
| IT | 0001353807 | 1/2004 |
| JP | 2001067293 A | 3/2001 |

OTHER PUBLICATIONS

International Search Report and Written Opinion of corresponding Application No. PCT/US2012/065673 mailed Feb. 1, 2013.

(Continued)

*Primary Examiner* — Rexford Barnie
*Assistant Examiner* — Toan Vu
(74) *Attorney, Agent, or Firm* — Nelson Mullins Riley & Scarborough, LLP

(57) ABSTRACT

A fueling environment communication system for providing high bandwidth information via existing field wiring to a plurality of forecourt devices. The communication system according to this aspect comprises a back room communication module having a first plurality of Ethernet ports for connection to external devices using Ethernet communication and a second plurality of Ethernet ports. The back room communication module further comprises a plurality of modulation interface devices each connected on a first side to a respective one of the second plurality of Ethernet ports. A summing and isolation module having a high pass filter is connected to each of the modulation interface devices on a second side thereof to pass a modulated high frequency signal. The summing and isolation module further has a low pass filter through which low frequency legacy data can be passed and combined with said modulated high frequency signal. In addition, summing and isolation module is connectable via existing field wiring to communicate with forecourt devices in point-to-point fashion.

22 Claims, 5 Drawing Sheets

(56) References Cited

U.S. PATENT DOCUMENTS

| | | |
|---|---|---|
| 5,980,090 A | 11/1999 | Royal, Jr. et al. |
| 6,351,689 B1 | 2/2002 | Carr et al. |
| 6,360,137 B1 | 3/2002 | Royal, Jr. et al. |
| 6,442,448 B1 | 8/2002 | Finley et al. |
| 6,546,314 B1 | 4/2003 | Carr et al. |
| 6,725,106 B1 | 4/2004 | Covington et al. |
| 6,801,835 B2 | 10/2004 | Covington et al. |
| 8,027,461 B1* | 9/2011 | Cress et al. ............... 379/390.02 |
| 2001/0052778 A1* | 12/2001 | Smith ........................... 324/541 |
| 2004/0204999 A1 | 10/2004 | Negley, III et al. |
| 2005/0124304 A1* | 6/2005 | Bendov ...................... 455/115.1 |
| 2005/0240541 A1 | 10/2005 | Giacaman |
| 2006/0079993 A1 | 4/2006 | Warn et al. |
| 2006/0079995 A1 | 4/2006 | Warn et al. |
| 2008/0010160 A1 | 1/2008 | Bridges et al. |
| 2008/0317472 A1* | 12/2008 | Park et al. ..................... 398/115 |
| 2009/0004024 A1 | 1/2009 | Durham et al. |
| 2009/0129403 A1 | 5/2009 | Harrell et al. |
| 2010/0064326 A1* | 3/2010 | Chen et al. ....................... 725/68 |
| 2010/0246488 A1* | 9/2010 | Li ....................... H04L 12/4625 370/328 |
| 2010/0268612 A1 | 10/2010 | Berrio et al. |
| 2010/0278313 A1* | 11/2010 | Summers ................ H04M 1/24 379/27.01 |
| 2011/0022223 A1* | 1/2011 | Johnson et al. .............. 700/232 |

OTHER PUBLICATIONS

U.S. Appl. No. 14/057,344, filed Oct. 18, 2013.
Extended European Search Report issued on May 6, 2015 in corresponding European patent application No. 12850023.8.
Office Action issued on Mar. 2, 2016 in corresponding Chinese patent application No. 201280067223.9.

\* cited by examiner

FUEL DISPENSING ENVIRONMENT UTILIZING RETROFIT BROADBAND COMMUNICATION SYSTEM

PRIORITY CLAIM

The present application is based upon and claims the benefit of U.S. provisional application Ser. No. 61/560,624, filed Nov. 16, 2011, which is incorporated herein by reference in its entirety for all purposes.

BACKGROUND OF THE INVENTION

The invention relates generally to fueling environments in which a plurality of reel dispensers are located in a forecourt area. More particularly, the present invention relates to a fueling environment utilising a retrofit communication system to provide broadband communication over legacy field wiring.

Existing fuel service forecourts are typically equipped with field wiring to provide communication between a point-of-sale system (POS) and the individual fuel dispensers for forecourt kiosks). The POS typically includes a forecourt controller function in order to control the operation of the individual fuel dispensers. Also, in the case of "pay at the pump," the POS receives payment information from the fuel dispensers in order to authorize the transaction and effect final payment. Recently, Gilbarco Inc., the assignee of the present invention, has proposed a system wherein certain forecourt functions are performed by a separate device (referred, to as an "enhanced dispenser hub") that communicates with a POS. The operation of an enhanced dispenser hub in a fueling environment is described in U.S. Pub. No. 2010/0268612, incorporated fully herein by reference for all purposes.

The prior art typically uses two-wire current loop or RS422 signaling for communications between the POS (or other back room controller) and the forecourt devices (e.g., fuel dispensers). These communication systems date to an era when dispensers were first connected via electrical signals and can typically provide no more than about 5 to 20 kbps of data throughput. However, the functionality desired at fuel dispensers has outgrown the limited capability that can be achieved with such low data rates.

For example, in recent years, fuel dispensers have become more than a means for fueling a vehicle. Service station owners are advertising at the dispenser with everything from simple signs to video displays running commercials. Some service stations have integrated fast-food or quick-serve restaurants, and the dispensers may allow the customer to order food from these restaurants. Additionally, the POS systems facilitate ordering other services, such as car washes, at the fuel dispenser. Most modern fuel dispensers include card readers or other payment means allowing payment for not only fuel, but also any products or services ordered at the dispenser.

These data-intensive features can be readily provided in a new service station because high bandwidth cable can be installed in the forecourt during construction. In the case of existing service stations, the cost to provide high bandwidth cable (e.g., Cat5) in the forecourt can be prohibitive. Alternative technologies, such as wireless solutions, may be prone to interference and outages, in view of these shortcomings, there have been attempts to provide legacy field wiring with high bandwidth capability. Some such devices use a mesh network topology (for example, utilizing power line communications technologies) that limits the total forecourt bandwidth. As a result each device suffers a loss of data throughput as more forecourt devices are added. Existing devices may also further compromise or limit data rates between a central controller and forecourt devices if significant data must be transmitted between forecourt devices and the central controller.

One example of a prior art system that attempts to provide a composite signal to a fuel dispenser using legacy wiring is shown in U.S. Pub. App. No. 2009/0129403 A1, incorporated herein by reference for all purposes.

SUMMARY OF THE INVENTION

The present invention recognizes and addresses the foregoing considerations, and others, of prior art constructions and methods.

In accordance with one aspect, the present invention provides a fueling environment communication system for providing high bandwidth communication via existing field wiring to a plurality of forecourt devices. The communication system according to this aspect comprises a back room communication module having a first plurality of Ethernet ports for connection to external devices using Ethernet communication and a second plurality of Ethernet ports. The hack room communication module farther comprises a plurality of modulation interface devices each connected on a first side to a respective one of the second plurality of Ethernet ports. A combiner module having a high pass filter is connected to each of the modulation interface devices on a second side thereof to pass a modulated high frequency signal. The combiner module further has a low pass filter through which low frequency legacy data can be passed and combined with said modulated high frequency signal. In addition, the combiner module is connectable via existing field wiring.

In accordance with another aspect, the present invention provides a system for providing high bandwidth communication via two wire field wiring coexisting in a power feed conduit with AC power wiring. The communication system according to this aspect comprises back room circuitry including a communication module having a first plurality of Ethernet ports for connection to external devices using Ethernet communication and a second plurality of Ethernet ports. A plurality of modulation interface devices are each connected on a first side to a respective one of the second plurality of Ethernet ports. Electrical isolation circuitry is connected on one side to respective modulation interface devices and connectable on another side to respective two wire field wiring. The modulation interface devices are operative to modulate and demodulate a modulated high frequency signal to communicate with remote devices in point-to-point fashion. The electrical isolation circuitry provides breakdown isolation of at least 3500 volts.

A further aspect of the present invention provides a system for providing high bandwidth communication via two wire field wiring coexisting in a power feed conduit with AC power wiring. The communication system according to this aspect comprises hack room circuitry including a communication module having at least one first Ethernet port for connection to an external device using Ethernet communication and at least one second Ethernet port. A respective modulation interface device is connected on a first side to the at least one second Ethernet port. Electrical isolation circuitry is connected on one side to the modulation interface device and connectable on another side to the two wire field wiring. The modulation interface device is operative to modulate and demodulate a modulated high frequency DSL signal to communicate with a remote device. The electrical isolation circuitry provides breakdown isolation of at least 3500 volts.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Repeat use of references numbers or characters in the present specification and drawings is intended to represent same or analogous features or elements of the invention.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations.

The present invention provides high quality data connectivity using existing ("legacy") field wiring without encountering problems of the current art. Various applications are facilitated by the invention, such as streaming of real time high definition video, real time surveillance camera data, decreased transaction time for secure payment transactions (which have considerably higher data requirements than non-secure transactions), and more comprehensive dispensing control (including real time sensing necessary for improved environmental sensing, wet stock management and fuel inventory control). Aspects of the present invention may also be useful with displays on top of fuel dispensers and service station price signs. As explained, aspects of the present invention may also be useful in various non-fuel (e.g., industrial) applications requiring broadband transmission within AC conduit applications.

Preferred embodiments of this invention provide greater than 50 Mbps downstream (toward forecourt devices) and greater than 25 Mbps upstream (toward the central controller). As a result, there is sufficient bandwidth such that many applications can be run independently with regard to each device on the forecourt, and work in the presence of existing low bandwidth data (i.e., legacy pump control or payment data) using legacy wiring. In addition, the content to each dispenser can be customised based, for example, on the customer's loyalty information.

Figure 1:
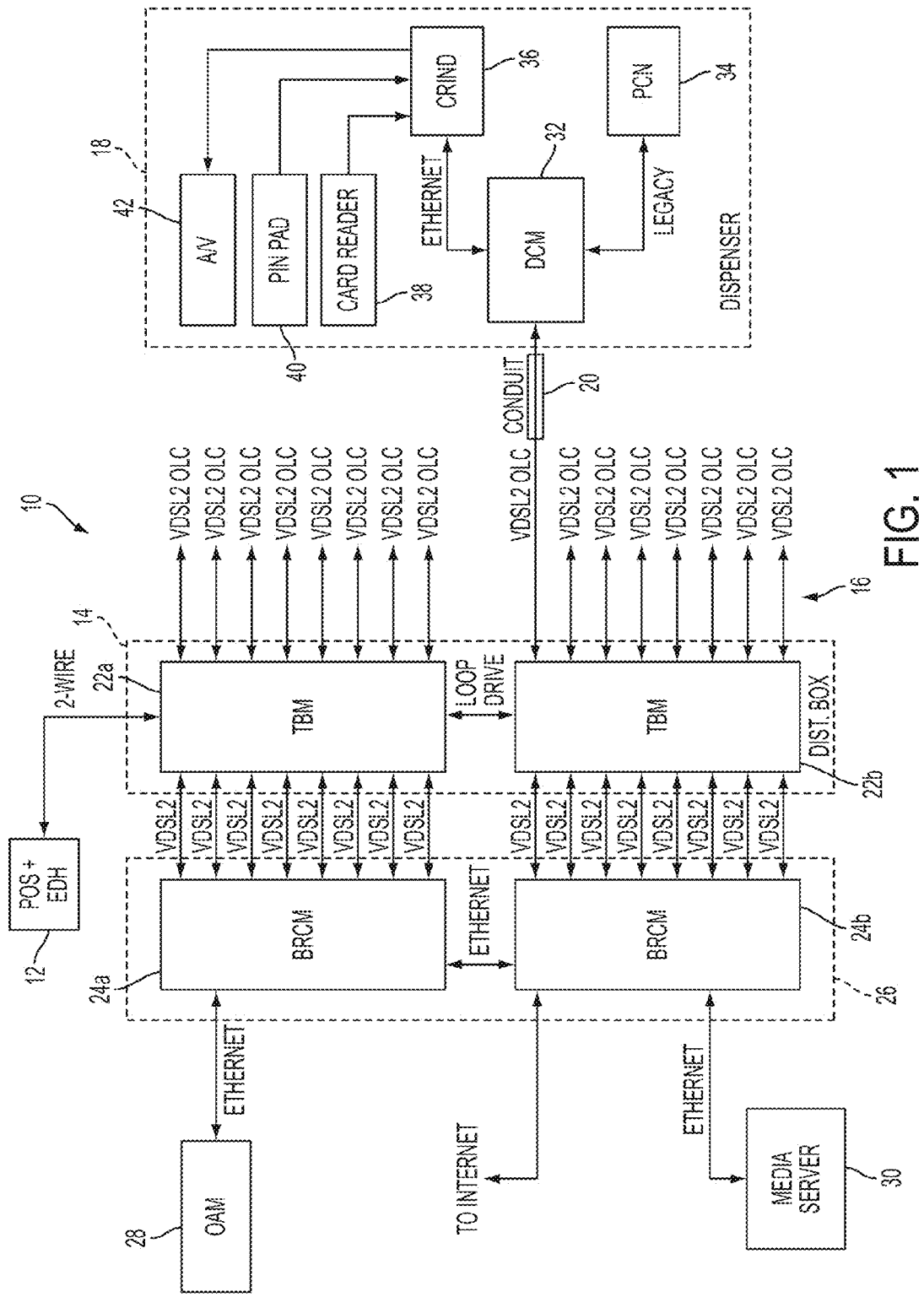
FIG. 1 is a diagram of a fueling environment incorporating a retrofit communication system in accordance with an embodiment of the present invention.

FIG. 1 shows an exemplary fueling environment utilising a retrofit communication system 10 in accordance with the present invention. The communication system 10 is employed between an existing POS, or, as shown here at 12, the combination of a POS and an enhanced dispenser hub ("EDH"). The POS (or POS plus EDH) typically communicates with a distribution box ("D-box") 14 via two wire current loop protocol or RS422 signaling, depending on the manufacturer. In this case, as shown, such communication occurs by two-wire. As will be explained more fully below, distribution box 14 contains components that combine low frequency data from the POS with high bandwidth data provided by other sources. The combined data is provided via field wiring (collectively 16) to the respective fuel dispensers (such as fuel dispenser 18) or kiosks that are located in the forecourt area.

The field wiring 16 will typically be two-wire current loop wiring that is already installed on the forecourt, although new wiring could also be installed. As will be explained more fully below, distribution box 14 (as well as the BRCM 24, discussed below) is typically adapted to allow broadband circuit elements to coexist within high voltage AC wiring conduits. As a result, in conjunction with appropriate trace spacing, distribution box 14 (or the BRCM 24) can directly interface with permanently installed physical electrical conduits (such as conduit 20) that carry AC power to the forecourt devices. In fact, although described in connection with a fueling environment, one skilled in the art will appreciate that a communication system described herein has application in many industrial environments where broadband communications need to coexist with high voltage AC power conduits.

As shown, embodiments of the present invention preferably utilise a point-to-point arrangement between the back room components and the forecourt devices. As a result, any number of forecourt devices may be provided without sacrificing bandwidth to each one. Moreover, independent applications may be utilized with the respective forecourt devices. Also, while the field wiring will often be twisted pair, embodiments of the present invention contemplate use of non-twisted pair wiring as well. This can be achieved because of the exceptional bandwidth and signal conditioning provided by aspects of the preferred embodiments.

In this embodiment, distribution box 14 includes multiple two-wire buffer modules ("TBM") 22a and 22b that provide communication to eight forecourt devices each (for a total of sixteen). In this embodiment, TBM 22a communicates with TBM 22b via external loop drive (because only one of them is connected to the POS). The TBMs each receive eight high bandwidth inputs from respective back room communication modules (BRCMs) 24a and 24b. In this case, BRCMs 24a and 24b are mounted within a common chassis 26.

As will be explained more fully below, each BRCM 24a and 24b includes one or more multiport switches, such as a gigabit Ethernet switch, to interconnect various Ethernet devices to the communication system. In this embodiment, for example, an operator and maintenance module ("OAM") 28 is connected to BRCM 24a. The OAM may be configured to allow an operator to perform various maintenance and monitoring functions relative to the communication system. In addition, a media server 30 is provided to present advertisements and other information messages to the fuel dispenser customer. These may include, for example, video messages, coupons, or internet content. A suitable modem provides connection to the communication system via another port of the Ethernet switch. On the other side, the Ethernet switches of each BRCM provide multiple signal ports for the respective forecourt devices.

Within the dispensers, communication system 10 includes a dispenser communication module ("DCM") 32 that interlaces with the dispenser's legacy systems. Such systems include a pump control node ("PCN") 34 which includes the hardware and software necessary to control the dispenser hydraulic functions. The GRIND (card reader in dispenser) module 36 includes the hardware and software necessary to support payment processing and peripheral interfaces, such as card reader 38, PIN pad 40 and graphical display 42. In this embodiment, communication with PCN 34 occurs by legacy protocol whereas communication with GRIND 36 is via Ethernet. Embodiments are contemplated in which both Ethernet and legacy communication lines go to GRIND 36. A separate line may provide legacy communication from GRIND 36 to PCN 34.

Figure 2:
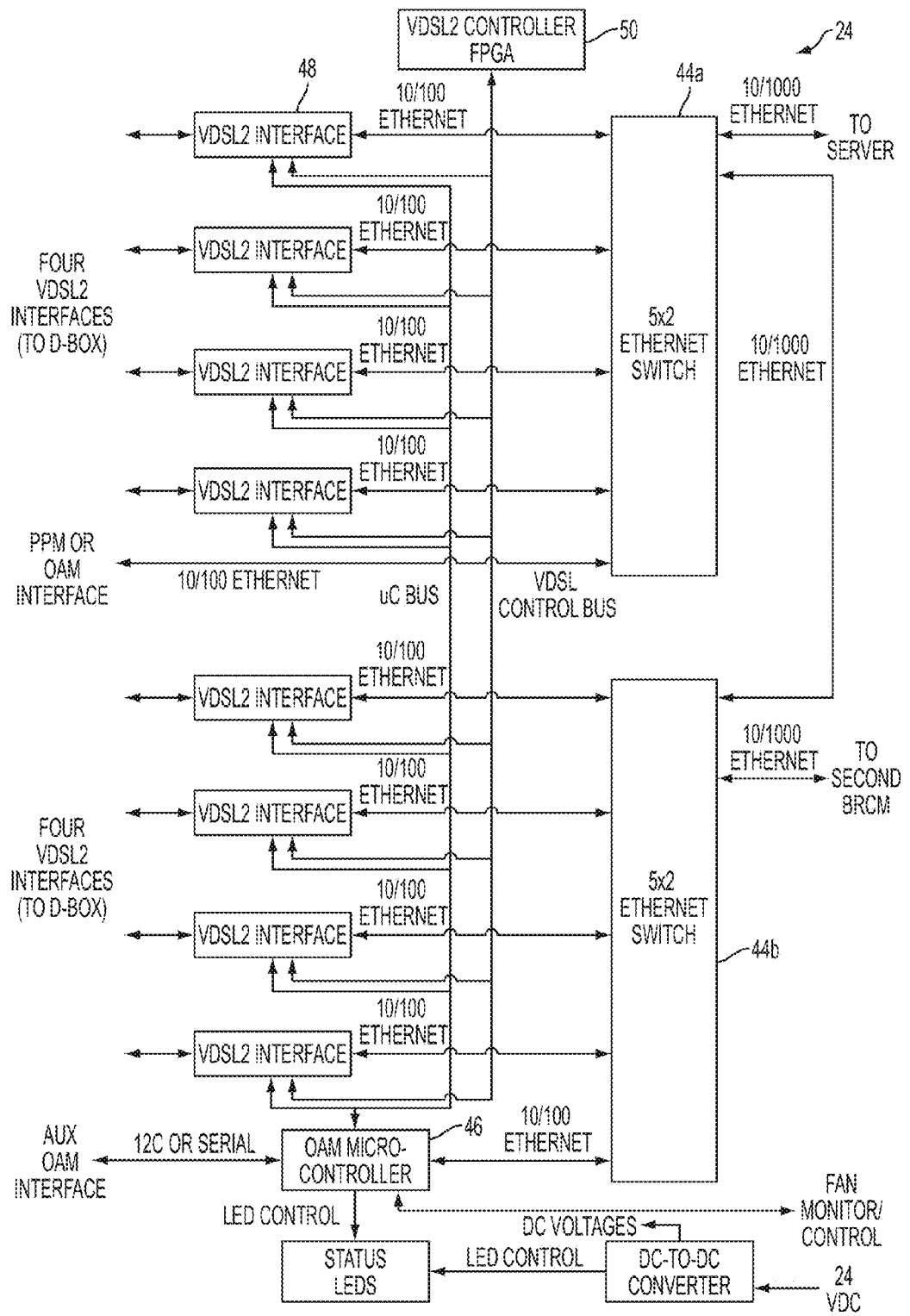
FIG. 2 is a detailed diagram of a back room communication module (BRCM) illustrated in FIG. 1.

Turning now to FIG. 2, certain additional details of a BRCM 24 can be more fully explained. As shown, BRCM 24 has, in this embodiment, a pair of 5×2 Ethernet switches respectively indicated at 44a and 44b. One port of the respective switches is used to connect them together. Other ports may be used for connection to other BRCMs or to the external sources noted above. For example, one port of switch 44b connects an OAM microcontroller 46. Similarly, one port of switch 44a can be used to connect another OAM or a protocol processor module (PPM). A PPM could provide an interconnection to a tank monitoring system, for example, used to track inventory and health of the underground fuel storage tanks and piping systems. Other auxiliary systems could be connected as well.

The PPM module (which can include an application(s) running on microprocessor also used for other purposes) can be implemented in both the BRCM in the back room, as well as the DCMs located within dispensers. For example, the PPM can host applications relative to back room functions and/or back room-to-dispenser communication functions. These applications can include control of locally special devices and/or implement special multiplexing/de-multiplexing logic. For example, one application is to implement a current loop protocol over TCP/IP multiplexer. Another example is implementation of proxies at dispensers or in the back rooms, for example, interception of certain protocol information relating to dispensing of fuels to enable real-time evaluation of forecourt-wide fuel flow rates. In the BRCM, these PPM applications can run on the OAM microcontroller 46, or on an external processor connected to the BRCM Ethernet interface. Similarly, relative to FIG. 2, the PPM can run on a microprocessor within the DCM 32 or on the CRIND 36. Integrating the PPM within the communications elements has significant advantages regarding integration of software applications, and overall system cost.

In the embodiment of FIG. 2, four ports of each switch are connected via Ethernet to a respective DSL modulation interface device (such as DSL interface 48). Each such interface may include a suitable chip set, such as a chip set supplied by Lantiq. Under the control of a FPGA controller 50, these interfaces convert the Ethernet signal to a signal suitable for transmission over legacy field wiring (as indicated by the eight lines labeled "Four VDSL2 Interfaces (to D-box)."

A variety of different modulation or multiplexing technologies may be used within the scope of the present invention. This embodiment, however, advantageously utilizes a form of DSL technology specially adapted for this application. In particular, each DSL interface within a BRCM 24 is preferably controlled on an individual basis to have "modified" band plans. In other words, the respective interface is adapted to provide a preferred band plan for the specific set of field wiring (also referred to as legacy cable) over which the high bandwidth signals will pass. In this regard, the controller 50 tests the connection and selects an appropriate set of spectral frequency ranges to disallow from use. Existing DSL technology utilizes DSP technology to adaptively weight each of numerous frequency ranges within the overall spectrum as to their use, based on noise or other interfering signals analyzed at the time the DSL link "trains." In addition, controller 50 can specifically disallow any use of certain frequency ranges at the lower end of the spectrum, to enable existing low data rate current loop or RS422 signals to operate on the legacy cable without interference. The set of disallowed frequency ranges can be selected or programmed on a per-link basis, based on the required bandwidth of the low rate signal or other requirements. For example, the lowest 600 kHz segment of the DSL band may be disallowed for better error rate performance of both legacy and broadband signaling and ease filtering requirements. This threshold may vary depending on location or other requirements of a particular installation, such as accommodation of specified legacy current loop, RS485 or other interface data rates, or specific RF or noise profiles of other signals present in the wiring conduit.

Figure 3:
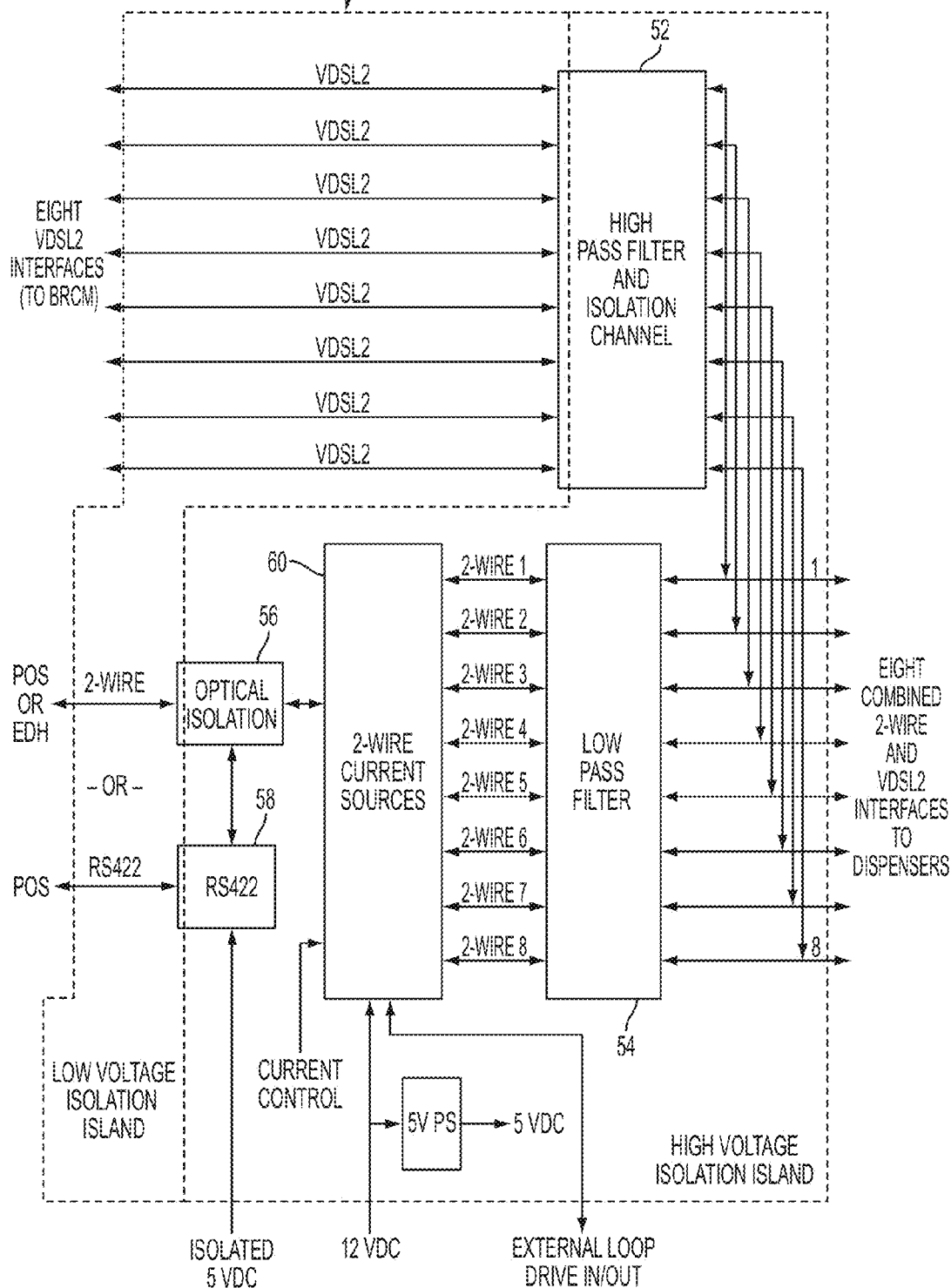
FIG. 3 is a detailed diagram of a two-wire buffer module (TBM) illustrated in FIG. 1.

Referring now to FIG. 3, the eight DSL communication lines from BRCM 24 are connected to a TBM 22. As can be seen, they pass through a high pass filter (and isolation channel) 52 before being combined with the output of a low pass filter 54. The combined signal is passed to (or from) a respective forecourt device over the legacy field wiring (or "OLC" for "over legacy cable"). In this case, high pass filter 52 is preferably implemented in capacitors only. For example, two capacitors may be used (one in each leg of the DSL signal) with a capacitance C that is small enough not to limit appreciably the signal over the desired range of frequencies. Preferably, however, the capacitors will have a sufficient voltage rating (e.g., 3500 volts) so that the field wiring can occupy an electrical power feed conduit as noted above.

Additionally, the DSL signals may pass through the isolation channel by being coupled through a suitable transformer. The transformer is configured to be suitable for passing the desired range of frequencies, and should also have a sufficient voltage rating (e.g., at least 3500 volts) so that the field wiring can occupy an electrical power feed conduit as noted above. These isolation techniques can also be applied to alternate modem technologies, such as Home-Plug.

For the legacy data, electrical isolation is provided by an opto-isolator module 56. In particular, module 56 may be connected on a "low voltage" side to a two-wire POS (or EDH). For POS systems that use RS422, a suitable RS422 isolator 58 is also preferably provided. It will thus be appreciated that that the capacitors of high pass filter 52 (or the isolation transformer of high pass filter 52), opto-isolator 56 and RS422 isolator 58 divide TBM22 into a "low voltage isolation island" and a "high voltage isolation island." Not all the components within the "high voltage isolation island" need to be rated to operate at high voltage, only those components that interface directly to the conduit. However, placing the non-high voltage rated components in the "high voltage isolation island" allows them to be used (in accordance with applicable standards and regulations) with wiring that passes through power feed conduit. In detail, UL standards require all communications wiring in the conduit to have a 3500 volts breakdown rating.

On the "high voltage" side, opto-isolator 56 feeds to two-wire current sources 60. In this case, current sources 60 comprise eight individual current source circuits that buffer the two-wire messages to the field wiring. Preferably, the current source drive level may be selectable by jumper to support a variety of different POS units. Jumpers or other disconnect methods can also be provided to allow isolating the conduit interfaces during servicing. In addition, low pass filter 54 is connected between current sources 60 and the field wiring. Preferably, the low pass filter may be implemented as an inductor only. The inductance L is preferably chosen so that it will not appreciably distort the two-wire signal, but will also not add appreciably to the DSL signal.

In an alternative embodiment, the BRCM may interface directly to a high voltage conduit in an installation where broadband communications over legacy cable are not necessary. In such an embodiment, one skilled in the art will appreciate that the isolation circuitry described above in TBM 22 may instead be located in the BRCM. Moreover, several components shown in FIG. 1 providing and combining the legacies signals (such as POS 12 and distribution box 14) need not be provided.

Figure 4:
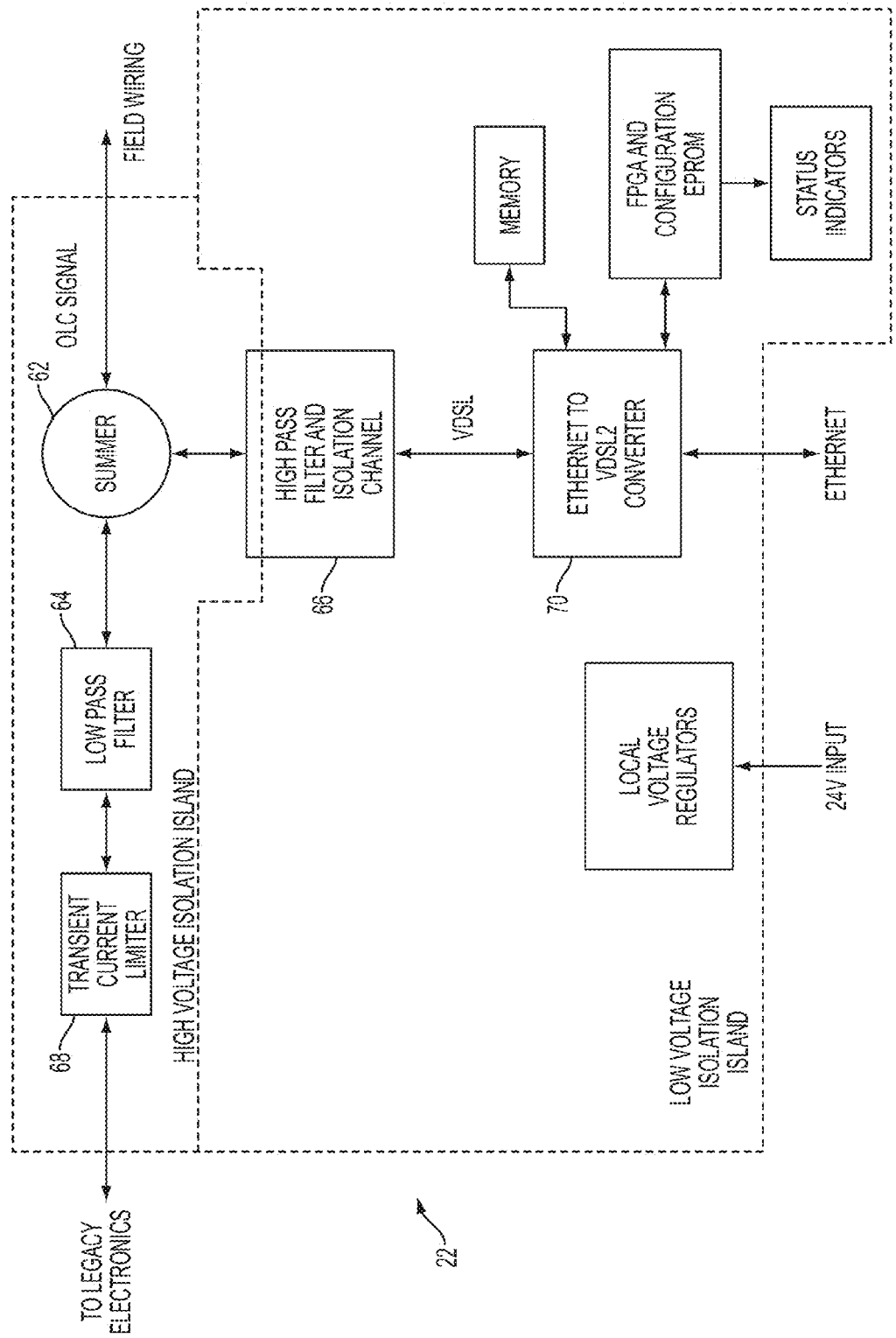
FIG. 4 is a detailed diagram of a dispenser communication module (DCM) illustrated in FIG. 1.

FIG. 4 illustrates certain additional details regarding a preferred embodiment of DCM 22. As one skilled in the art will appreciate, many components of DCM 22 are analogous to those in TBM 22. In this regard, an OLC signal coming from field wiring is provided to a summer 62 to which a low pass filter 64 and a high pass filter (and isolation channel) 66 are connected. As can be seen, the legacy data from low pass filter 64 is passed to a transient current limiter (TCL) circuit 68 and then to the legacy electronics. As one skilled in the art will appreciate, the legacy data may include pump control data, payment data or both depending on the particular installation. In some cases, for example, pump control data, and payment data, may be sent over separate sets of legacy wiring, in which case the DSL signal will be combined with one but not the other.

The legacy electronics will typically already include optical isolation components such that summer 62, low pass filter 64, and TCL 68 can be thought of as a "high voltage isolation island." In the illustrated embodiment, TCL 68 is provided to protect the legacy electronics from failure due to the necessary filtering. In particular, the interaction between the low pass and high pass filters and the optical isolation circuit in the dispenser could create transient high current in the optical coupler circuit. These high current transients could occur, for example, when the dispenser coupler closes the current loop, as in transmitting data. This is prevented by TCL circuit 68, which is in series with the dispenser's optical coupler. The TCL actively reduces the maximum current to levels which are suitable for the optical coupler components.

The TCL is preferably configured to be bypassed as necessary or desirable for non-current loop or other applications that do not need transient current limiting. This can be done with wiring options at the interface connector, jump jacks or under bill of materials modification, or software control.

The transformers in high pass filter 66 function to isolate low frequency signals on the "high voltage isolation island" from passing to the "low voltage isolation island", and to couple high frequency DSL signals from the "high voltage isolation island" to the "low voltage isolation island." Like TBM 22, this provides the isolation necessary if the field wiring is installed in power feed conduit. The resulting DSL signal is provided to a converter 70, which converts between DSL and Ethernet. As a result, the signals on the other side of converter 70 are Ethernet signals which can be used for various high bandwidth applications, such as those discussed above.

Figure 5:
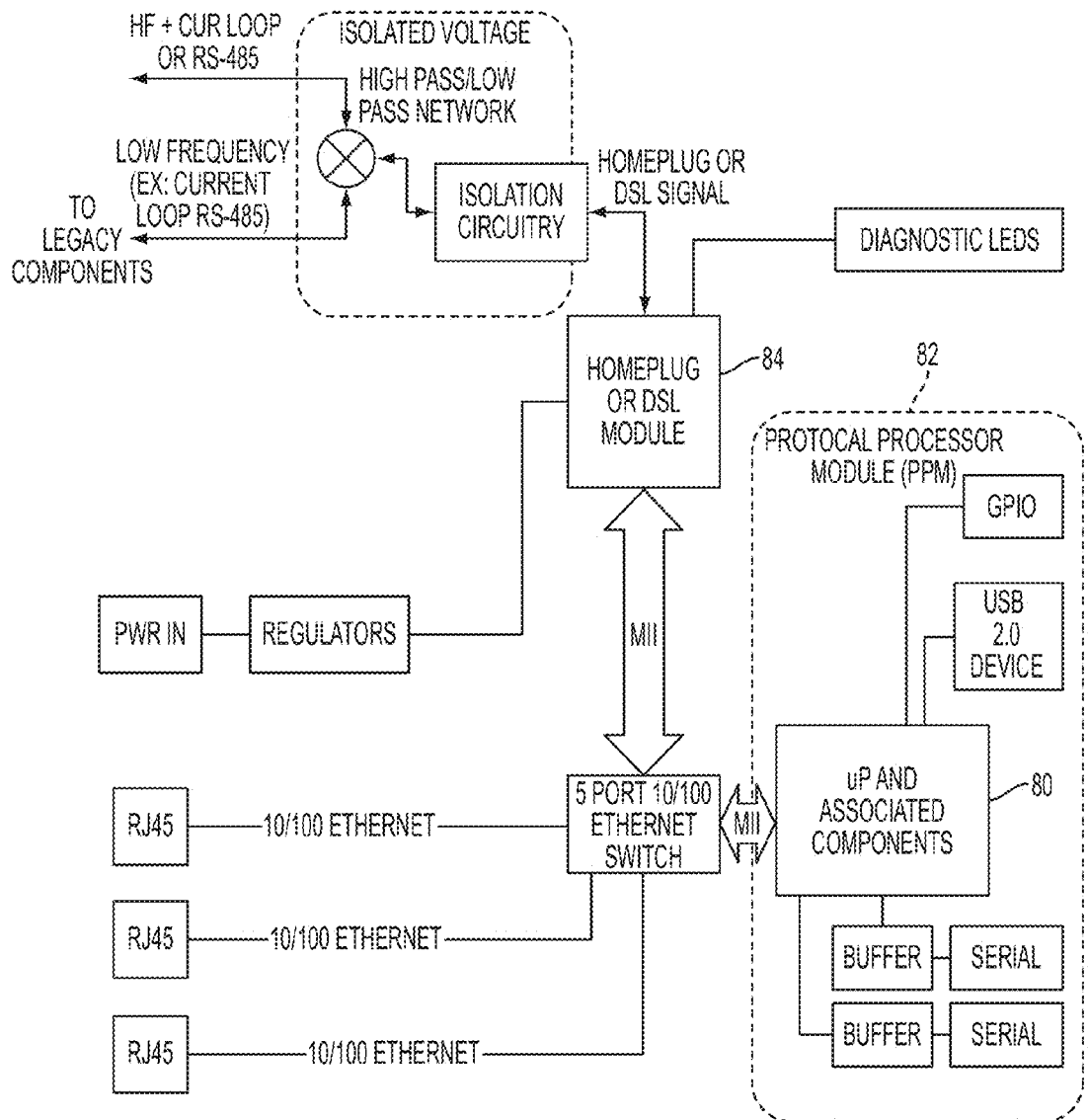
FIG. 5 is a diagram showing an alternative embodiment of a DCM in accordance with the present invention.

FIG. 5 illustrates an alternative embodiment of a DCM that utilizes either HomePlug or DSL technology, as necessary or desired. The function and operation of most components of this DCM will be apparent from the above discussion. In the case of HomePlug, one skilled in the art will appreciate that the BRCM in that case would also utilise HomePlug rather than DSL.

In this embodiment, however, the DCM includes a microcontroller 80 that implements a PPM 82. (A similar PPM may also be implemented in the back room electronics in addition to or instead of PPM 82.) As can be seen, microcontroller 80 is connected via Ethernet to the main OLC transceiver 84. In addition, microcontroller 80 exposes GPIO, serial interface(s) and USB interface to the external world. Preferably, microcontroller 80 acts not simply as a serial-to-Ethernet converter, but rather contains specific application(s) able to control locally special devices and/or implement special multiplexing/de-multiplexing logic. For example, one application is to implement a two wire over TCP/IP multiplexer application.

As should be apparent to those skilled in the art, many advantages are realized by a communication system in accordance with the present invention. For example, a broadband forecourt communication system in accordance with the present invention enables numerous applications not previously available on the fueling forecourt, such as high definition video. In addition, a network of fueling sites may be configured to utilise one central controller for controlling media systems, surveillance systems, and mission-critical sensing systems. A central controller connected to the Internet can download and modify content to be pushed in real time to any device on the forecourt at any fueling site, where each device can utilise different content simultaneously. Further, remote monitoring and diagnostics can be affected to the communications subsystem of any fueling site. In this regard, system operator and maintenance functions can be accomplished locally and remotely via HTTP connections. Moreover, existing low data rate communications (such as current loop and RS-422) can be replaced with high data rate communications utilising TCP/IP.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. For example, aspects of one embodiment may be combined with aspects of other embodiments to yield still further embodiments. Therefore, it is contemplated that any and all such embodiments are included in the present invention as may fall within the scope and spirit thereof.

What is claimed is:

1. A fueling environment communication system for providing high bandwidth communication between a first location in a fueling environment and a plurality of forecourt devices remote from said first location via a plurality of existing field wiring extending between said first location and respective of said forecourt devices, said communication system comprising:

a back room communication module having a first plurality of Ethernet ports for connection to external devices using Ethernet communication and a second plurality of Ethernet ports;

said back room communication module further comprising a plurality of modulation interface devices each connected on a first side to a respective one of said second plurality of Ethernet ports, said modulation interface devices operative to convert between a modulated high frequency signal and an Ethernet signal;

a combiner module having a high pass filter connected to each of said modulation interface devices on a second side thereof to pass said modulated high frequency signal;

said combiner module having a low pass filter through which low frequency legacy data can be passed and combined with said modulated high frequency signal to produce a plurality of combined signals to be passed to respective of said forecourt devices; and said combiner module connectable via said plurality of existing field wiring to communicate said plurality of combined signals with respective of said forecourt devices in point-to-point fashion in respective field wiring.

2. A fueling environment communication system as set forth in claim 1, wherein said combiner further comprises electrical isolation circuitry such that said field wiring may be located in power feed conduit.

3. A fueling environment communication system as set forth in claim 2, wherein said isolation circuitry includes an opto-isolator for the low frequency legacy data.

4. A fueling environment communication system as set forth in claim 2, wherein said isolation circuitry includes a plurality of capacitors for said modulated high frequency signal.

5. A fueling environment communication system as set forth in claim 4, wherein said plurality of capacitors comprise said high pass filter.

6. A fueling environment communication system as set forth in claim 1, further comprising a respective communication module located in said forecourt devices and connected to said respective field wiring, said communication module having first and second communication lines for the low frequency legacy data and the high frequency modulated signal, respectively.

7. A fueling environment communication system as set forth in claim 6, wherein said first communication line includes a TCL circuit in electrical communication with a low pass filter thereof.

8. A fueling environment communication system as set forth in claim 6, wherein said high frequency modulated signal is a DSL signal.

9. A fueling environment communication system as set forth in claim 8, wherein a lower portion of a typical DSL radio frequency spectrum is permanently disallowed to facilitate reliable communication of the low frequency legacy data.

10. A fueling environment communication system as set forth in claim 6, wherein a frequency bandplan for a communication channel to a particular forecourt device is individualized to facilitate communication over specific field wiring cable to accommodate at least one of legacy current loop, RS485, specific RF profiles, and specific noise profiles of other signals present in the wiring conduit.

11. A fueling environment communication system as set forth in claim 10, wherein a different set of spectral frequency ranges is disallowed in each of said communication channels to respective of said forecourt devices.

12. A fueling environment communication system as set forth in claim 1, wherein said plurality of forecourt devices comprise fuel dispensers.

13. A fueling environment communication system as set forth in claim 1, further comprising a protocol processor module.

14. A system for providing high bandwidth communication via two wire field wiring coexisting in a power feed conduit along with separate AC power wiring, said communication system comprising back room circuitry including:

a communication module having a first plurality of Ethernet ports for connection to external devices using Ethernet communication and a second plurality of Ethernet ports;

a plurality of modulation interface devices each connected on a first side to a respective one of said second plurality of Ethernet ports;

electrical isolation circuitry connected on one side to respective of said modulation interface devices and connectable on another side to a respective of said two wire field wiring;

said modulation interface devices operative to modulate and demodulate a modulated high frequency signal from and to an Ethernet signal to communicate with a respective remote device from among a plurality of remote devices in point-to-point fashion, said remote device also receiving power from said separate AC power wiring; and said electrical isolation circuitry providing breakdown isolation of at least 3500 volts.

15. A system as set forth in claim 14, wherein said isolation circuitry includes a plurality of capacitors for said modulated high frequency signal.

16. A system as set forth in claim 14, wherein said modulation interface devices are operative to provide Ethernet to DSL conversion.

17. A system as set forth in claim 16, wherein a frequency bandplan for a communication channel to a particular remote device is individualized to facilitate communication over specific field wiring cable.

18. A system as set forth in claim 14, wherein said circuitry includes combiner circuitry operative to combine said modulated high frequency signal with a low frequency legacy data.

19. A system as set forth in claim 18, wherein said combiner includes high pass filter for passing the modulated high frequency signal and a low pass filter for passing the low frequency legacy data.

20. A system as set forth in claim 18, wherein said isolation circuitry includes a plurality of capacitors which comprise said high pass filter.

21. A system as set forth in claim 14, wherein at least one of said remote devices comprises a fuel dispenser.

22. A system for providing high bandwidth communication via two wire field wiring coexisting in a power feed conduit along with separate AC power wiring, said communication system comprising back room circuitry including:

a communication module having at least one first Ethernet port for connection to an external device using Ethernet communication and at least one second Ethernet port;

a respective modulation interface device connected on a first side to said at least one second Ethernet port;

electrical isolation circuitry connected on one side to said modulation interface device and connectable on another side to said two wire field wiring;

said modulation interface device operative to modulate and demodulate a modulated high frequency DSL signal from and to an Ethernet signal to communicate with a remote device from among a plurality of remote devices in point-to-point fashion, said remote device also receiving power from said separate AC power wiring; and said electrical isolation circuitry providing breakdown isolation of at least 3500 volts.

\* \* \* \* \*

UNITED STATES PATENT AND TRADEMARK OFFICE
CERTIFICATE OF CORRECTION

PATENT NO. : 9,496,920 B2  
APPLICATION NO. : 13/679764  
DATED : November 15, 2016  
INVENTOR(S) : Giovanni Carapelli et al.

Page 1 of 1

It is certified that error appears in the above-identified patent and that said Letters Patent is hereby corrected as shown below:

In the Specification

Column 1, Line 15, please delete the word "reel" and replace with the word --fuel--.

Column 1, Line 23, please delete the word "for" and replace with --(or--.

Column 2, Line 25, please delete the word "hack" and replace with the word --back--.

Column 5, Line 4-5, please delete the word "interlaces" and replace with --interfaces--.

Column 5, Lines 8, 13, 15 and 17, please delete the word "GRIND" and replace with --CRIND--.

Column 5, Line 48, please delete "FIG. 2" and replace with --FIG. 1--.

Column 6, Line 51, please delete "opto-isoiator" and replace with --opto-isolator--.

Signed and Sealed this  
Second Day of May, 2017

Michelle K. Lee  
*Director of the United States Patent and Trademark Office*